(12) United States Patent
Hart et al.

(10) Patent No.: US 8,730,960 B2
(45) Date of Patent: May 20, 2014

(54) PROVIDING MULTICAST TRANSMISSIONS WITH PARTIAL STATE BLOCK ACKNOWLEDGMENTS AND RETRIES

(75) Inventors: Brian Donald Hart, Sunnyvale, CA (US); Santosh Pandey, Santa Clara, CA (US); Rohit Suri, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 259 days.

(21) Appl. No.: 13/280,835

(22) Filed: Oct. 25, 2011

(65) Prior Publication Data

US 2013/0100952 A1    Apr. 25, 2013

(51) Int. Cl.
*H04J 3/26* (2006.01)
*H04H 20/71* (2008.01)
*H04W 4/00* (2009.01)

(52) U.S. Cl.
USPC ............ 370/390; 370/312; 370/328; 370/432

(58) Field of Classification Search
USPC ................ 370/312–315, 328–342, 390–432, 370/447–476
See application file for complete search history.

(56) References Cited

U.S. PATENT DOCUMENTS

| | | | |
|---|---|---|---|
| 7,433,329 B2 | 10/2008 | Qian | |
| 7,463,642 B2 | 12/2008 | Qian | |
| 7,535,858 B2 * | 5/2009 | Trainin et al. | 370/278 |
| 7,599,363 B2 * | 10/2009 | Jang et al. | 370/389 |
| 7,688,855 B2 | 3/2010 | Qian | |
| 7,872,997 B2 | 1/2011 | Qian | |
| 7,916,670 B2 * | 3/2011 | Trainin et al. | 370/282 |
| 7,948,991 B1 | 5/2011 | Hart et al. | |
| 8,369,257 B2 * | 2/2013 | Chu et al. | 370/312 |
| 8,416,809 B2 * | 4/2013 | Jang et al. | 370/476 |
| 8,483,105 B2 * | 7/2013 | Nanda et al. | 370/278 |
| 2007/0191052 A1 | 8/2007 | Kneckt et al. | |
| 2009/0052363 A1 * | 2/2009 | Matsue et al. | 370/312 |
| 2010/0220678 A1 * | 9/2010 | Wentink | 370/329 |
| 2011/0176489 A1 * | 7/2011 | Trainin et al. | 370/328 |
| 2011/0286402 A1 * | 11/2011 | Gong | 370/329 |

OTHER PUBLICATIONS

IEEE P802.11aa/D6.0, Jul. 2011, pp. 75-79.
Enhanced Distributed Channel Access (EDCA), IEEE 802.11e, 2005, Wikipedia http://en.wikipedia.org/wiki/IEEE_802.11e-2005.

* cited by examiner

*Primary Examiner* — Man Phan
(74) *Attorney, Agent, or Firm* — Tucker Ellis LLP (57) ABSTRACT

Described herein are techniques that provide for the transmission of a multicast stream that can resend frames that were not received using the partial state block acknowledgement mechanism. In an example embodiment, an access point reserves a channel for a transmission opportunity of a sufficient length to allow the sending of multicast data, block acknowledgement request, and receipt of a block acknowledgement. Optionally, the transmission opportunity may be of sufficient length to enable packets that re resent to be sent during the transmission opportunity, thereby preventing other stations on the channel from gaining control of the channel. Alternatively, the access point may employ an appropriate backoff between TXOPs to AP prevent (T)DLS traffic to the recipients of the multicast stream. The access point does not send any frames from other queues during the transmission opportunity.

20 Claims, 5 Drawing Sheets

PROVIDING MULTICAST TRANSMISSIONS WITH PARTIAL STATE BLOCK ACKNOWLEDGMENTS AND RETRIES

TECHNICAL FIELD

The present disclosure relates generally to multicast data transmissions.

BACKGROUND

Multicast transmissions are unreliable because they are sent onto a medium subject to collisions, but without a retry or inter-packet Forward Error Correction (FEC) mechanism. Directed Multicast Service (DMS) performs a multicast to unicast conversion (M2U2C) of a multicast stream. When a multicast stream is sent as a unicast stream, it inherits the unicast retry mechanism. However, this scheme is inefficient, and in some cases, such as very large groups and/or video flows with high bandwidth requirements, impossible. Group Cast Retries (GCR), formerly known as More Reliable Groupcast (MRG), improves multicast reliability. GCR supports multiple acknowledgement (ACK) policies, including M2U2C, unsolicited retries, also known as repeat-x, and a Block Ack (BA) mechanism. The BA mechanism may be a Full State BA or a partial state BA. Partial state BA imposes certain restrictions on transmissions, for example there can be only one outstanding flow, identified by a TID ("Traffic Identifier"), at the receiver that is waiting for a BAR.

BRIEF DESCRIPTION OF THE DRAWINGS

The accompanying drawings incorporated herein and forming a part of the specification illustrate the example embodiments.

OVERVIEW OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

Described herein are techniques that provide for the transmission of a multicast stream employing partial state block acknowledgement mechanism. In an example embodiment, a networked device such as an access point reserves a channel for a transmission opportunity of a sufficient length to allow the sending of multicast data, a block acknowledgement request, and receipt of a block acknowledgement. Optionally, the transmission opportunity may be of sufficient length to enable packets that re-resent to be sent during the transmission opportunity, thereby preventing other stations on the channel from gaining control of the channel. The access point does not send any frames from other queues during the transmission opportunity.

In an example embodiment, the networked device employs a plurality of transmission opportunities for sending the multicast stream and providing for block acknowledgement requests and block acknowledgements. The transmission opportunities are separated either by an interframe space that prevents other stations on the channel from gaining control of the channel (e.g., a PIFS "Priority Interframe Spacing"), or by a backoff with constraints so that the intended multicast stream recipients are not sent other traffic from their access point or from other stations.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Disclosed in an example embodiment herein is a technique for sending a multicast stream that supports Partial State BA within one transmission opportunity (TXOP). A TXOP is a bounded time interval during which an AP/station can send as many frames as possible, as long as the duration of the transmission does not extend beyond the maximum duration of the TXOP.

For example, if at least one client is in Power Save (PS) mode and is not GCR capable, then multicast traffic for a GCR stream is sent after a DTIM (Delivery Traffic Indication Message) beacon, or after an appropriate FMS (Flexible Multicast Service) beacon if FMS is in use for the multicast stream. As used herein, "beacon" may refer to any type of beacon such as a DTIM or FMS beacon. During a transmission of multicast frames after a beacon, the access point (AP) sends buffered multicast frames within the same TXOP for one GCR stream using legacy multicast at RIFS/SIFS (Reduced Interframe Space/Short Interframe Space) spacing. The AP sets the TXOP to be long enough so that the AP can also send a set of BAR ("Block Acknowledgment Request") frames to all or a subset of GCR group members and receive BA responses in order to determine which frames were not received correctly (i.e. polled BAR/BA). Since the multicast data is immediately (i.e. at SIFS) followed by a BAR frame, and there are no intervening transmissions subject to a different BA agreement, clients are able to use the partial state BA mechanism.

In an example embodiment, multicast transmissions are sent employing Partial State BA across multiple TXOPs. In particular embodiments, the AP splits the data and BAR/BA frames across multiple TXOPs separated by either a PIFS (Priority Interframe Spacing), while at the same time the AP ensures that BAR/BA frames are retained within the same TXOP and ensures that no other queues, such as EDCA queues, at the AP can pre-empt the beacon groupcast queue, or use a backoff time period.

In an example embodiment, the AP disallows all DLS (Direct Link Setup) and TDLS (Tunneled Direct Link Setup) traffic to members of the GCR group (e.g., by disallowing all Direct Link Setup (DLS) and Tunneled DLS (TDLS) traffic), so that traffic to the client is limited to traffic from the AP. This may be achieved a) by the AP advertising that it is incapable of DLS, and/or b) by inspecting all frames that transit the AP and discarding any TDLS frames. Once (T)DLs is prevented, the AP can split the data and BAR/BA frames across multiple TXOPs separated by backoffs in order to improve the likelihood that retries are not subject to collisions, even though another station may gain control of the channel and transmit in the middle of the AP's multicast transmissions. At the same time the AP should constrain the splitting behavior to ensure that the BAR/BA frames are retained within the same TXOP. Finally, during these multiple TXOPs, the AP must ensure that no other EDCA queues within the AP can pre-empt the beacon groupcast queue. By disallowing TDLS, DLS and other internally contending queues within the AP, the AP can guarantee that there are no intervening transmissions to the client.

In an example embodiment, a GCR group consists of 802.11n compatible stations (STAs). If there are no pre-802.11n devices in the GCR group (e.g., there are no pre-802.11n devices in a Basic Service Set "BSS"), the AP can send the data within an aggregate frame such as an A-MPDU (Aggregated Media Access Control "MAC" Protocol Data Unit) instead of sending separate data frames separated by SIFS.

In an example embodiment, an AP replaces a polled sequence of GCR BAR+BA frames with a "Scheduled BAR" frame. The "Scheduled BAR" frame lists all or a subset of group members, and identifies when each should respond, leading to such frame sequences as ScheduledBAR (AP→STA1,STA2), BA(STA1→AP), BA(STA2→AP) The AP receives BA responses and determines which frames were not received correctly. Since the multicast data is immediately followed by a BAR frame, and there are no intervening transmissions subject to a different BA agreement, clients are able to use the partial state BA mechanism. This scheduled BAR+BA+BA falls within the HCCA (HCF "Hybrid Coordination Function" Controlled Channel Access) channel access mechanism.

In an example embodiment, Partial State BA with retried BARs are supported. For example, a BAR or BA may not be correctly received. For example, if the data is much longer than the BAR/BA frames, a well designed AP may initially retry the BAR: e.g., the AP resends BAR(s) to the STAs from which an expected BA was not received. Once all the BAs are received or BAR retries are exhausted, and the AP determines that not all multicast frames were correctly received, if the multicast frames have not reached their max number of retries or some other limit, then the AP further retries the multicast frames that were not correctly received. To support retried partial state BARs, the AP ensures that no intervening transmissions are possible subject to a different BA agreement. As part of this retry procedure, the AP may perform rate adaptation, for instance the AP can lower the data rate for control or data frames.

Figure 1:
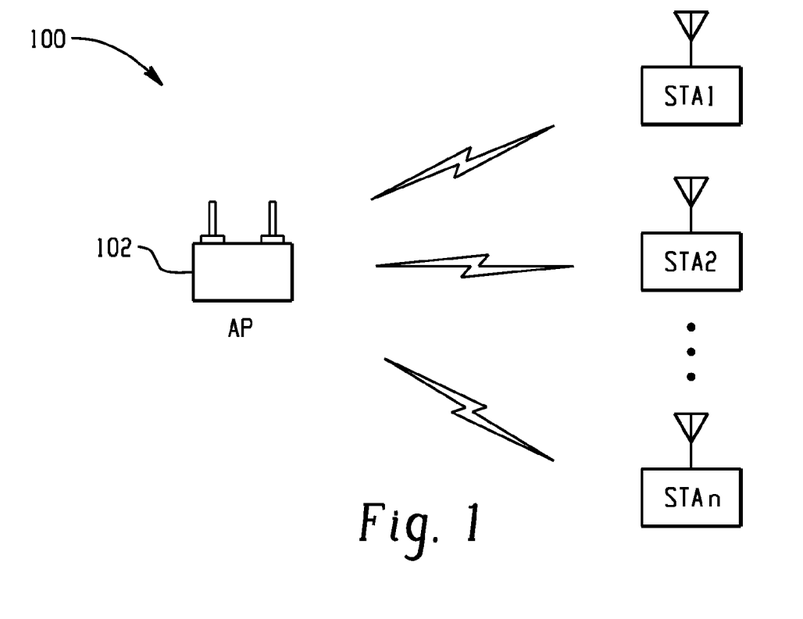
FIG. 1 is a block diagram illustrating an example of a network with an access point operable to send multicast streams using partial state block acknowledgements where packets can be resent in accordance with an example embodiment.

FIG. 1 is a block diagram illustrating an example of a network 100 with an access point (AP) 102 operable to send multicast streams using partial state block acknowledgement agreements where packets can be resent in accordance with an example embodiment. In the illustrated example, AP 102 communicates with a plurality of wireless stations STA1, STA2, . . . STAn, where n is an integer greater than two; however, those skilled in the art should readily appreciate that the number of wireless stations chosen for this example is merely for ease of illustration and that the principles described herein are applicable to multicast streams sent by AP 102 to as few as one wireless station or to as many as is physically realizable. Moreover, the example embodiments described herein refer to a GCR multicast stream and to the Institute of Electrical and Electronics Engineers (IEEE) 802.11 standards; however, these examples are provided in order to employ well defined terminology for ease of description, and that the principles described herein may be applied to any suitable protocol that provides any number of multicast streams as described herein.

In an example embodiment, AP 102 sends one or more multicast streams to one or more of STA1, STA2, . . . STAn. For example, STA1 may belong to a first and second multicast group, while STA2 belongs to the second multicast group, and the remaining STA's can belong to other, or no multicast groups. The preceding illustrates an example where a multicast group may distributed to as few as one or as many as all of the stations associated with AP 102.

In an example embodiment, the AP 102 transmits channel reservation data to reserve a channel for a transmission opportunity (TXOP). Any suitable means for transmitting channel reservation data may be employed. For example, the Duration field of the multicast packet may be used to specify the TXOP. In an example embodiment, a request to send (RTS) and/or clear to send (CTS) frame may comprise data reservation data. In yet another example embodiment, the TXOP may be specified in a beacon preceding transmission of the multicast data.

The AP 102 is operable to transmit multicast data during the transmission opportunity. The AP 102 is further operable to transmit a block acknowledgement request (BAR) for the multicast data during the transmission opportunity. The AP 102 is also operable to wait to receive a block acknowledgement (BA) for the multicast data during the transmission opportunity. The AP 102 does not send data for other queues during the transmission opportunity.

In an example embodiment, the block acknowledgement request is a partial state block acknowledgment request and the block acknowledgement is a partial state block acknowledgment. The block acknowledgment request can be an individual block acknowledgment request or a scheduled block acknowledgment request. As used herein, an individual block acknowledgment request is directed to an individual station, thus a BAR is sent as a poll to individual subscribers of the multicast stream (e.g., for the second multicast group a first BAR is sent to STA1 and a second BAR is sent to STA2, e.g., BAR-STA1/BA-STA1 and BAR-STA2/BA-STA2). As used herein, a scheduled BAR schedules a response time for multiple subscribers to the multicast stream (e.g., for the second multicast group one BAR may be sent to both members of the group, e.g., BAR(AP→STA1,STA2)+BA(STA1→AP)+BA (STA2→AP).

In an example embodiment, the AP 102 prevents direct link setup (DLS) between stations (e.g., STA1, STA2, . . . STAn) in the BSS, such as by advertising that the AP is DLS-incapable. In particular embodiments, the AP 102 prevents tunneled direct link setup (TDLS) between stations on the channel, such as by inspecting packets sent between clients in the BSS, detecting TDLS frames, and either discarding them or impersonating the responder and responding with a failure message. Alternatively, the AP may detect that no clients are capable of (T)DLS and then no further action by the AP is required. Finally, the AP only needs to prevent (T)DLS between clients that are recipients of the multicast flows for which the AP wants to enable the partial state BA mechanism, so a more targeted prevention of (T)DLS is possible too— e.g., failure messages to selected clients only.

In an example embodiment, the AP 102 retries sending the multicast data during the transmission opportunity to any stations that did not correctly receive it. The AP 102 can determine which stations correctly received the data from the BA's received by the AP 102. In an example embodiment, where multiple frames are sent, the AP 102 retries sending frames that were not acknowledged by at least one wireless station. For example, if the AP 102 sends a multicast burst to the second group comprising five frames, and STA1 sends a BA indicating it received all of the frames and STA2 sends a BA indicating it did not receive the third frame, then just the third frame needs to be resent, not the entire burst.

In an example embodiment, if the AP 102 does not receive a BA from a station in the group, the AP 102 may change the data transmission rate for the block acknowledgment request to a new data transmission rate and resend the block acknowledgment request. For example, the AP 102 may resend the block acknowledgment request at a lower data rate.

In an example embodiment, the AP 102 splits multicast frames, block acknowledgment requests, and/or the time period to wait for block acknowledgment frames into multiple TXOPs. For example, multicast frames, BAR frames, BA frames (and retries of same) may be sent in a plurality of TXOPs. In particular embodiments, the same TXOP is used for a BAR and its corresponding BAs. In an example embodiment, a time period between the TXOPs is employed that prevents other stations on the channel from gaining control of the channel. For example, a PIFS interframe space may be employed. As another example a backoff using AC_VO may be used if (T)DLS is prevented (e.g., the IEEE 802.11e standard defines access class priority levels which by increasing level of priority are: Background "AC_BK", Best Effort "AC_BE", Video "AC_VI", and voice "AC_VO").

In an example embodiment, the AP 102 does not send frames from any other queue during the plurality of TXOPs to any recipient of the multicast traffic. This allows partial state BAs to be supported.

In an example embodiment, the AP 102 controller reserves the channel after sending a predefined beacon for sending multicast data. For example, multicast data may be sent after a DTIM and/or FMS beacon.

In an example embodiment, AP 102 sends at least one multicast frame belonging to a multicast stream that is a group cast retries (GCR) compatible multicast stream (see, e.g., IEEE 802.11 as draft standard version 6.0 dated July 2011). The AP 102 may order the multicast frames by type of multicast stream (e.g., non-GCR compatible, GCR compatible and/or multicast group. For example, after a beacon, the AP 102 may send multicast frames that are not GCR compatible (e.g., legacy 802.11 multicast) followed by group 1 GCR compatible multicast frames, followed by group 2 GCR compatible multicast frames, etc. (see e.g., FIG. 6).

Figure 2:
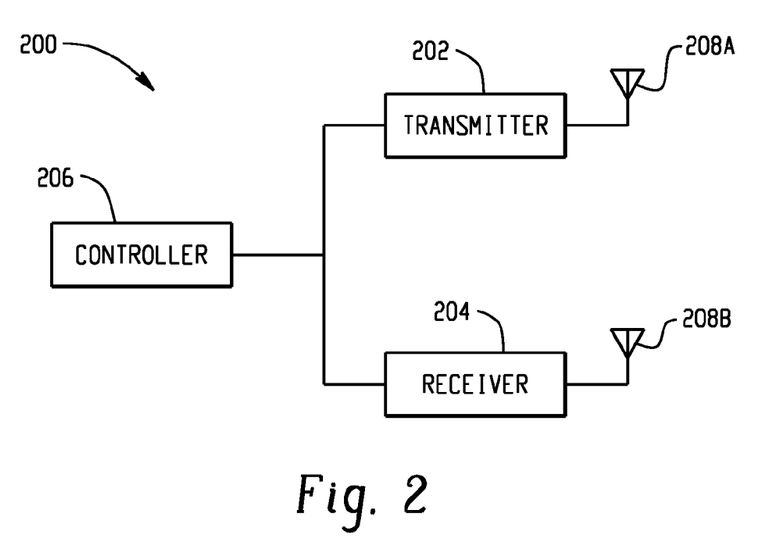
FIG. 2 is a block diagram illustrating an example of a networked device operable to send multicast streams using partial state block acknowledgements where packets can be resent in accordance with an example embodiment.

FIG. 2 is a block diagram illustrating an example of a networked device 200, such as an access point, operable to send multicast streams using partial state block acknowledgements where packets can be resent in accordance with an example embodiment. Networked device 200 is suitable to provide the functionality described herein for AP 102 (FIG. 1). Networked device 200 comprises a transmitter 202 for sending data, a receiver 204 for receiving data, and a controller 206 coupled with transmitter 202 and receiver 204 and operable to send and receive data via transmitter 202 and receiver 204 respectively. In the illustrated example the transmitter 202 is coupled to an antenna 208A while the receiver 204 is coupled to antenna 208B; however, those skilled in the art can readily appreciate that the transmitter 202 and the receiver 204 can be coupled to a common antenna.

In an example embodiment, controller 206 suitably comprises logic for performing the functionality described herein. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit ("ASIC"), system on a chip ("SoC"), programmable system on a chip ("PSOC"), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

In an example embodiment, controller 206 sends one or more multicast streams to one or more wireless stations. For example, a first station (not shown, see e.g., STA1 in FIG. 1) may belong to a first and second multicast group, while a second station (not shown, see e.g., STA2 in FIG. 1) belongs to the second multicast group, and the remaining STA's can belong to other, or no multicast groups.

In an example embodiment, the controller 206 transmits channel reservation data to the transmitter 202 to reserve a channel for a transmission opportunity (TXOP). Any suitable means for transmitting channel reservation data may be employed. For example, the Duration field of the multicast packet may be used to specify the TXOP. In an example embodiment, a request to send (RTS) and/or clear to send (CTS) frame may comprise data reservation data. In yet another example embodiment, the TXOP may be specified in a beacon preceding transmission of the multicast frame.

The controller 206 is operable to transmit a multicast data during the transmission opportunity. The controller 206 is further operable to transmit a block acknowledgement request (BAR) for the multicast data during the transmission opportunity. In an example embodiment, the controller 206 is further operable to wait to receive a block acknowledgement (BA) for the multicast data during the transmission opportunity. The controller 206 does not send frames for any other queue during the transmission opportunity.

In an example embodiment, the block acknowledgement request is a partial state block acknowledgment request and the block acknowledgement is a partial state block acknowledgment. The block acknowledgment request can be an individual block acknowledgment request e.g., polled) or a scheduled block acknowledgment request. As used herein, an individual block acknowledgment request is directed to an individual station, thus a BAR is sent to individual subscribers of the multicast stream In an example embodiment, the controller 206 prevents direct link setup (DLS) between stations on the channel. In particular embodiments, the AP 102 prevents tunneled direct link setup (TDLS) between stations on the channel.

In an example embodiment, the controller 206 retries sending the multicast data during the transmission opportunity to any stations that did not receive it. The controller 206 can determine which stations received the data from the BA's received by the controller 206 via receiver 204. In an example embodiment, where multiple frames are sent, the controller 206 retries sending frames that were not acknowledged by at least one wireless station. The controller 206 may send retries until a predefined condition is met. For example, the controller 206 may retry up to a predefined maximum number retries, and/or retry up to a maximum time limit. In particular embodiments, the amount of retries may be based on a predefined condition. For example more retries may be sent (e.g., the actual number of retries sent or the time period allocated for sending retries) for higher priority frames (e.g., I video MPEG2 frames) than for lower priority frames (e.g., B video MPEG2 frames), etc.

In an example embodiment, if the controller 206 does not receive a BA from a station that the controller 206 expected to receive a response from, the controller 206 changes a data transmission rate for the block acknowledgment request to a new data transmission rate and resends the block acknowledgment request. For example, the controller 206 may resend the block acknowledgment request at a lower data rate.

In an example embodiment, the controller 206 splits multicast frames, block acknowledgment requests, and/or the time period to wait for block acknowledgment frames into multiple TXOPs. For example, multicast frames may be sent in a plurality of TXOPs, followed by BARs and the time period for receiving BAs which may also be split across a plurality of TXOPs. In particular embodiments, the same TXOP is used for a BAR and its corresponding BAs. In an example embodiment, a time period between the TXOPs is employed that prevents other stations on the channel from gaining control of the channel. For example, a PIFS interframe space may be employed. As another example a backoff using AC_VO (e.g., the IEEE 802.11e standard defines four access class priority levels which by increasing level of priority are: Background "AC_BK", Best Effort "AC_BE", Video "AC_VI", and voice "AC_VO").

In an example embodiment, the controller 206 does not send frames for any other queue during the plurality of TXOPs. This allows partial state BAs to be supported.

In an example embodiment, the controller 206 reserves the channel after sending a predefined beacon for sending multicast data. For example, multicast data may be sent after a DTIM and/or FMS beacon.

In an example embodiment, controller 206 sends at least multicast one multicast frame belonging to a multicast stream that is a group cast retries (GCR) compatible multicast stream (described herein supra). The controller 206 may order the multicast frames by type of multicast stream (e.g., non-GCR compatible, CGR compatible and/or multicast group). For example, after a beacon, the controller 206 may send multicast frames for a first group that are not GCR compatible followed by GCR compatible multicast frames for the first group, followed by GCR compatible multicast frames for the second group, etc. (see e.g., FIG. 6).

Figure 3:
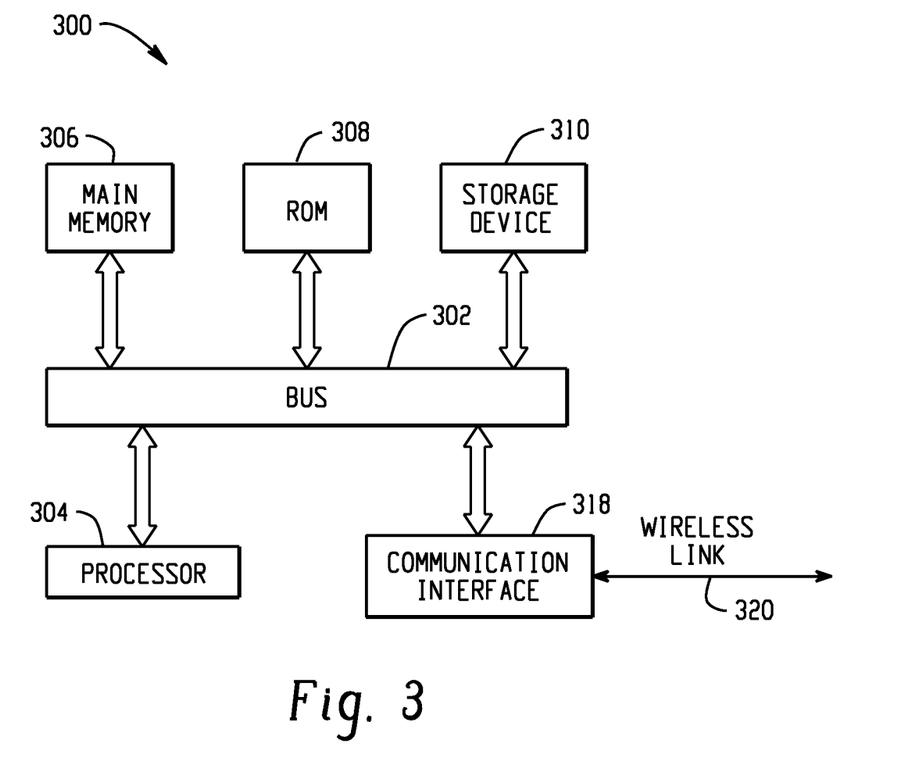
FIG. 3 is a block diagram of a computer system upon which an example embodiment can be implemented.

FIG. 3 is a block diagram of a computer system 300 upon which an example embodiment can be implemented. Computer system 300 is suitable for implementing the functionality described herein for AP 102 (FIG. 1) and/or control logic 206 (FIG. 2).

Computer system 300 includes a bus 302 or other communication mechanism for communicating information and a processor 304 coupled with bus 302 for processing information. Computer system 300 also includes a main memory 306, such as random access memory (RAM) or other dynamic storage device coupled to bus 302 for storing information and instructions to be executed by processor 304. Main memory 306 also may be used for storing a temporary variable or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

An aspect of the example embodiment is related to the use of computer system 300 for providing multicast transmissions with partial state block acknowledgements and retries. According to an example embodiment, partial state block acknowledgements and retries are provided by computer system 300 in response to processor 304 executing one or more sequences of one or more instructions contained in main memory 306. Such instructions may be read into main memory 306 from another computer-readable medium, such as storage device 310. Execution of the sequence of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 304 for execution. Such a medium may take many forms, including but not limited to non-volatile media, and volatile media. Non-volatile media include for example optical or magnetic disks, such as storage device 310. Volatile media include dynamic memory such as main memory 306. As used herein, tangible media may include volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 304 for execution. For example, the instructions may initially be borne on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306 from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling computer system 300 to other devices such as wireless stations. For example, processor 304 can send multicast frames via communication interface 318 to wireless stations as described herein.

Figure 4:
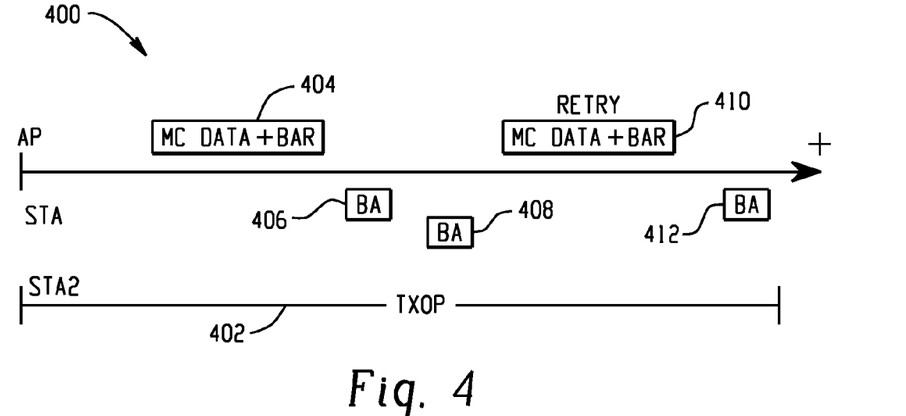
FIG. 4 is a signal diagram illustrating an example of multicast data being sent that allows for retries with partial state block acknowledgments during a single transmission opportunity (TXOP).

FIG. 4 is a signal diagram 400 illustrating an example of multicast data being sent that allows for retries with partial state block acknowledgments during a single transmission opportunity (TXOP) 402. In the illustrated example, multicast data and a BAR 404, are transmitted by an AP. The first wireless station (STA1) responds with a block acknowledgment (BA) 406 and the second wireless station (STA2) responds with BA 408. The AP determines whether there is unacknowledged multicast data and resends the unacknowledged multicast data and a BAR 410. In the illustrated example, only STA1 has unacknowledged data, and upon correctly receiving the resent multicast data replies with BA 412.

Figure 5:
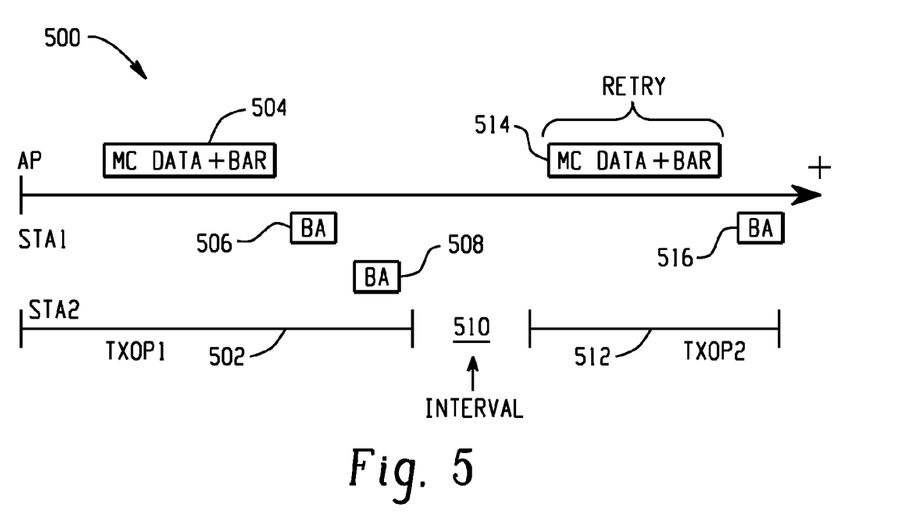
FIG. 5 is a signal diagram illustrating an example of multicast data being sent that allows for retries with partial state block acknowledgments during a plurality of transmission opportunities (TXOPs).

FIG. 5 is a signal diagram 500 illustrating an example of multicast data being sent that allows for retries with partial state block acknowledgments during a plurality of transmission opportunities (TXOPs) using individual block acknowledgement requests. Multicast data and a BAR are sent by the AP during a first TXOP 502 as illustrated 504. In the illustrated example, STA1 sends BA 506 and STA2 sends BA 508 during the first TXOP 502. The AP waits a time interval that prevents other multicast streams from being sent. In an example embodiment, a backoff time period is employed between TXOXPs 510 and 512. Backoff time periods may be employed for collision mitigation with neighboring APs and/or stations belonging to neighboring basic service sets. In particular embodiments, the AP prevents TDLS and DLS between stations. In another example embodiment, an interframe space such as a PIFS or short interframe space (SIFS) may be employed as the time interval between TXOPs 510 and 512.

The AP retries sends unacknowledged multicast data with a BAR as indicated by 514 during the second TXOP 516. The second TXOP 512 is of sufficient duration for STA1 to send BA 516. Additional retries may be sent during additional TXOPs (not shown) as needed. Retries may be sent until a predefined condition is met, for example, until the number of retries exceeds a predefined amount or until a predefined time period expires.

Although the preceding examples in FIG. 4 and FIG. 5 employ scheduled BARs, those skilled in the art should readily appreciate that the techniques described herein are also suitable for embodiments employing individual (or polled) BARs. In embodiments, employing individual BARs, the TXOPs are adjusted to accommodate the additional time required for individual BARs/BAs.

Figure 6:
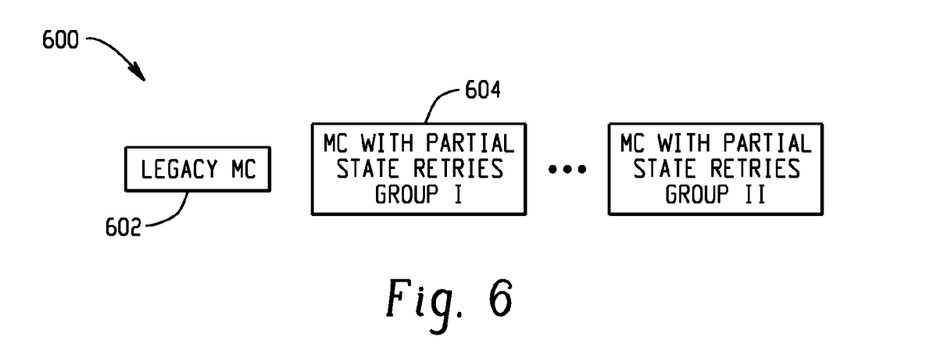
FIG. 6 is a signal diagram illustrating an example of multicast data being sent that allows for retries with partial state block acknowledgments with legacy unacknowledged multicast data.

FIG. 6 is a signal diagram 600 illustrating an example of multicast data being sent that allows for legacy multicast data (e.g., multicast frames which are sent without expecting an acknowledgment) to be sent with multicast streams employing partial state block acknowledgments with retries. In the illustrated example, legacy multicast frames for a multicast group are sent followed by multicast streams using a partial state BA mechanism with retries. For example, legacy multicast frames are sent as illustrated by 602. Multicast data for a first multicast stream employing partial state BAs and retries is sent after the legacy multicast frames as illustrated by 604. The data (multicast "MC" data+BAR+BA) for the first multicast stream may be sent in one TXOP or during a plurality of TXOPs. Additional multicast stream may be sent with partial state BAs and retries. Data for the last multicast stream employing partial BAs and retries, Group n, where n is an integer greater than one, is sent as illustrated by FIG. 6.

Figure 7:
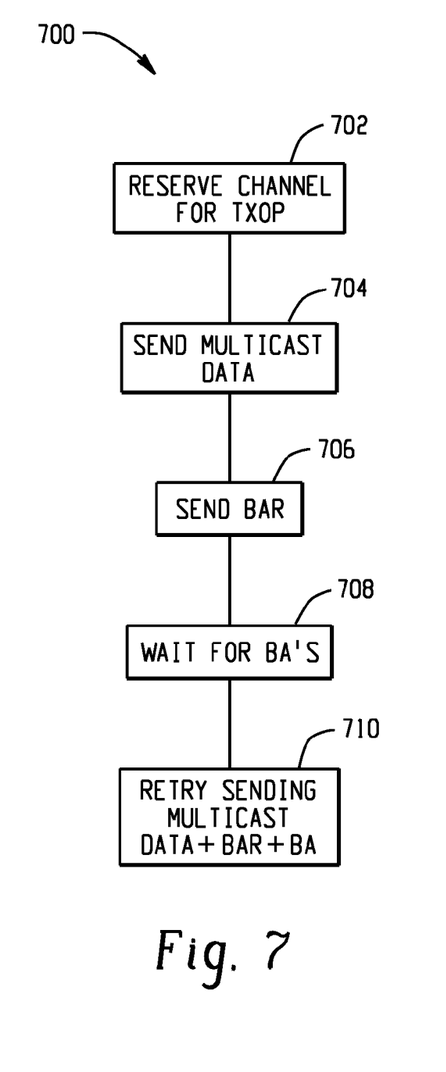
FIG. 7 is a block diagram illustrating an example of a methodology for sending multicast data with partial state block acknowledgement requests allowing for retries during a single transmit opportunity (TXOP).
Figure 8:
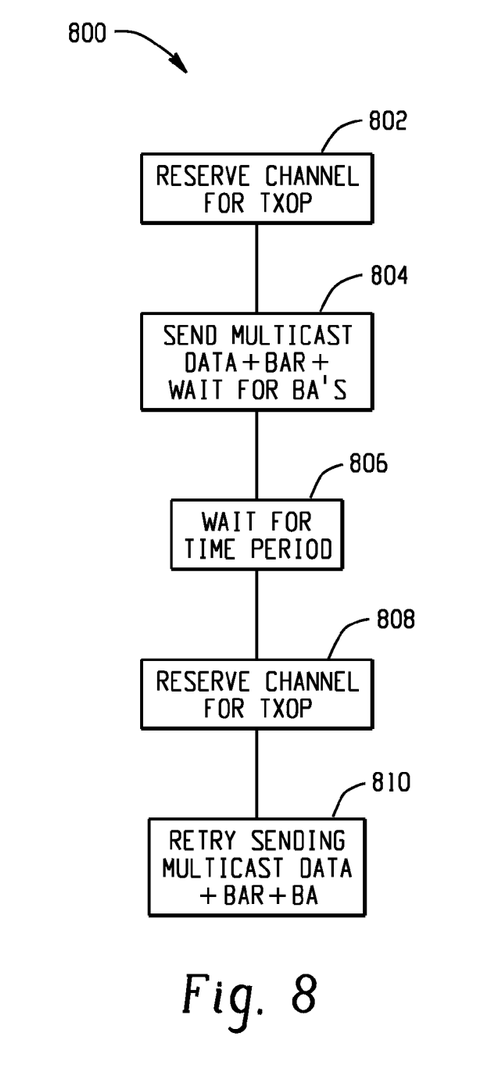
FIG. 8 is a block diagram illustrating an example of a methodology for sending multicast data with partial state block acknowledgement requests allowing for retries during a plurality of transmit opportunity (TXOPs).
Figure 9:
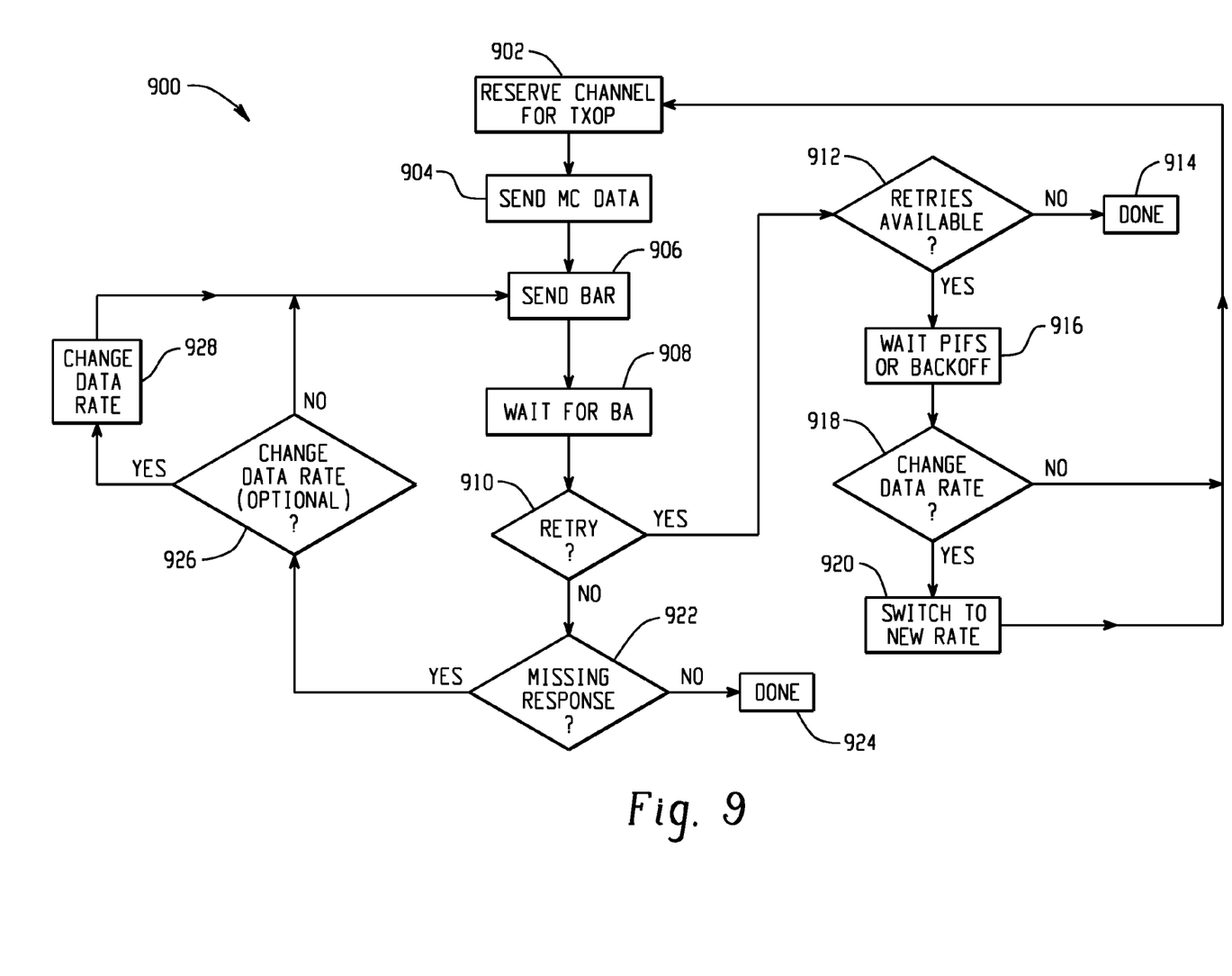
FIG. 9 is a block diagram illustrating an example of a detailed methodology for sending multicast frames which can adjust the data rate for block acknowledgment requests in response to not receiving an expected block acknowledgment.

In view of the foregoing structural and functional features described above, a methodologies in accordance with example embodiments will be better appreciated with reference to FIGS. 7-9. While, for purposes of simplicity of explanation, the methodologies of FIGS. 7-9 are shown and described as executing serially, it is to be understood and appreciated that the example embodiments are not limited by their illustrated orders, as some aspects could occur in different orders and/or concurrently with other aspects from that shown and described herein. Moreover, not all illustrated features may be required to implement a methodology in accordance with an aspect of an example embodiment. The methodologies described herein are suitably adapted to be implemented in hardware, software, or a combination thereof.

FIG. 7 is a block diagram illustrating an example of a methodology 700 for sending multicast data with partial state block acknowledgement requests allowing for retries during a single transmit opportunity (TXOP). Methodology 700 may be implemented by AP 102 (FIG. 1), control logic 206 (FIG. 2), and/or computer system 300 (FIG. 3).

At 702, the channel is reserved by the AP for a TXOP. The first TXOP may vary in length. The AP may reserve the channel by any suitable means such as by sending a RTS frame. In an example embodiment, the AP may use the Duration field in a multicast frame to specify the TXOP. In another example embodiment, the AP puts TXOP data in a beacon frame.

At 704, the AP sends multicast data. The multicast data may suitably comprise one or more frames for a multicast stream.

At 706, the AP sends a block acknowledgement request (BAR). The BAR may be an individual BAR (e.g., polling) or a scheduled BAR.

At 708, the AP waits for responses, a block acknowledgments (BA) to the BAR. The AP can determine from the BAs which frames were correctly received, and provided that sufficient time remains in the TXOP can resend unacknowledged frames, which in an example embodiment includes frames that were not received by a station and/or frames that were received incorrectly, e.g., frames that could not be validated.

At 710, the AP retries sending the multicast data that was not correctly received during the same TXOP. In particular embodiments, the AP also sends a BAR and waits for BAs for the resent frames during the same TXOP. Unacknowledged frames may be resent as often as needed, or until a predefined condition occurs. For example, retries may be limited to a certain number of retries, or retries may cease when the TXOP expires.

FIG. 8 is a block diagram illustrating an example of a methodology 800 for sending multicast data with partial state block acknowledgement requests allowing for retries during a plurality of transmit opportunity (TXOPs). Methodology 800 may be implemented by AP 102 (FIG. 1), control logic 206 (FIG. 2), and/or computer system 300 (FIG. 3).

At 802, the AP reserves the channel for a first TXOP. The first TXOP may be specified in the header of a multicast frame, a RTS frame, or a beacon frame.

At 804, the AP sends multicast data. The multicast data may suitably comprise multiple multicast frames for a multicast group, multicast frames for a plurality of multicast flows, and/or multicast frames for a plurality of multicast groups. In addition, a scheduled BAR, or individual BARs, are sent and the AP waits for BAs in response to the BAR(s).

In an example embodiment, multiple TXOPs may be employed for sending the multicast data. At the end of a first TXOP, the AP sends a frame specifying a TXOP for a second (subsequent) TXOP. For example, after the first TXOP expires, a Duration field in the header of the next multicast frame may specify a length of the next TXOP. In an example embodiment, a backoff time period may be between TXOPs. In another example embodiment, the TXOPs are separated by an interframe space that enables the AP to maintain control of the channel. For example, using PIFS spacing between TXOPs would prevent another station within a cell from taking control of the channel.

At 806, the AP waits for a time interval before sending additional data. The time interval may be a suitable backoff period for collision mitigation. TDLS and DLS may be blocked to prevent stations from sending data to each other while partial state BAs are being employed. In another example embodiment, an interframe space, such as a PIFS, is employed that prevents other stations from gaining control of the channel.

At 808, the channel is reserved for a second TXOP. In the illustrated example, this TXOP is employed for resending unacknowledged multicast frames; however, this TXOP may be used for sending additional multicast frames, and/or BAR/BA frames if there was insufficient time in the first TXOP.

At 810, the AP retries sending unacknowledged multicast data. In particular embodiments, the AP also sends a BAR and waits for a corresponding BA. The BAR may be a scheduled BAR or the AP may send individual BARs. Additional retries may be employed as needed. Steps 808 and 810 may be repeated as often as necessary, or until a predefined condition is met (e.g., until a time period expires or until a threshold number of retries has been exceeded) to resend unacknowledged frames.

FIG. 9 is a block diagram illustrating an example of a detailed methodology 900 for sending multicast frames which can adjust the data rate for block acknowledgment requests in response to not receiving an expected block acknowledgment. Methodology 900 may be implemented by AP 102 (FIG. 1), control logic 206 (FIG. 2), and/or computer system 300 (FIG. 3).

At 902, a channel is reserved by an AP for a TXOP. The channel may be reserved by any suitable technique, including techniques described herein supra.

At 904, the AP sends multicast (MC) data. The multicast data may include multiple multicast frames for a multicast stream, multicast frames for multicast streams, and/or multicast frames for multiple multicast groups.

At 906, the AP sends a BAR. The BAR may be an individual BAR or a scheduled BAR. In particular embodiments, the BAR is for a partial state BA.

At 908, the AP waits for responses, e.g., BA frames, to the BAR. At 910, a determination is made whether any multicast frames should be resent. The determination is made based on BAs received from members of the multicast group.

If, at 910, a determination is made that at least one multicast frame is to be resent (YES); at 912, a determination is made whether a retry can be sent. For example, retries may be limited to a predetermined number of retries, or retries may only be available during a predefined time period (for example until a TXOP expires). If, at 912, a determination is made that retires are not available (NO), the methodology stops as indicated by 914 (DONE). If, however, at 912, a determination is made at 914 (YES), the access point will retry sending the at least, one multicast frame to be resent. Optionally, if a multiple TXOPs are being employed for sending the multicast data, the AP waits a time interval that prevents other stations from sending multicast data to the multicast data group before sending the retry as illustrated at 91.6. The time interval may be a backoff interval, which may allow stations with time bounded applications such as voice to send an uplink frame. Optionally, the AP may block TDLS and DLS to prevent a station from sending data to a member of the multicast group.

Optionally, at 918, the data rate may be changed. If at 918, a decision is made to change the data rate (YES), the data rate is changed at 920; otherwise (NO), the data rate is not changed. Processing returns to 902 where the channel is reserved, and 904 (send multicast frames to be resent), 906 (send BAR), 908 (wait for BAR) and 910 (determine whether any multicast frames should be resent) are repeated.

In the illustrated example, if at 910, no multicast frames are being resent (NO), at 922, a determination is made whether a BA is missing. In other embodiments, 922 may be executed concurrently or before 910.

For example, the AP may determine if it received a BA frame response from members of a multicast group. If at 910, a determination is made that a BA was received from stations that the AP expected to receive a response from (NO), the AP is done as indicated by 924.

If, however, at 910, the determination is made that a BA was not received from a station that the AP expected to receive a response from (YES), the AP may optionally change the data rate as indicated by 926, If the data rate is to be changed (YES), at 928 the data rate for control frames and/or BAR frames may be changed as indicated by 928, and a BAR is sent at 906. For example, the data rate may be changed to the lowest rate or a predefined default rate. If, at 926, the data rate is not being changed (NO), a BAR for the missing BA is sent as indicated at 906. Note that any of 906, 908, 910, 922, 926, and/or 928 may be repeated until a response is received from all members of a multicast group; or may be repeated a predefined number of times, until a predefined time-out, and/or until a predefined condition (for example the data rate is lowered by a certain amount each iteration until a minimum data rate is achieved).

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
    a transmitter for communicating on one or more channels;
    a receiver;
    a controller coupled with the transmitter and receiver;
    wherein the controller is operable to transmit channel reservation data via the transmitter to reserve a first channel for a transmission opportunity;

wherein the controller is operable to transmit multicast data during the transmission opportunity;

wherein the controller is operable to transmit a block acknowledgement request for the multicast data during the transmission opportunity;

wherein the controller is operable to wait to receive a block acknowledgement for the multicast data via the receiver during the transmission opportunity;

wherein the controller selectively changes a data transmission rate for the block acknowledgment request to a new data transmission rate responsive to not receiving an expected block acknowledgement;

wherein the controller selectively retries the block acknowledgment request at the new data transmission rate; and wherein the controller selectively resends unacknowledged multicast data during the transmission opportunity.

2. The apparatus set forth in claim 1, wherein the block acknowledgement request and the block acknowledgement are sent under a partial state block acknowledgement agreement.

3. The apparatus set forth in claim 1, wherein the block acknowledgment request is an individual block acknowledgment request.

4. The apparatus set forth in claim 1, wherein the block acknowledgment request is a scheduled block acknowledgment request.

5. The apparatus set forth in claim 1, wherein the controller sends a poll frame instead of a block acknowledgment request frame to recipients of the multicast frame.

6. An apparatus, comprising:
a transmitter for communicating on a channel;
a receiver;
a controller coupled with the transmitter and receiver;
wherein the controller is operable to transmit multicast data for a first multicast group, block acknowledgement requests and wait for block acknowledgements during a plurality of transmission opportunities;
wherein the controller is operable to transmit multicast data belonging to a first group cast retries compatible multicast stream for the first multicast group;
wherein the controller is operable to selectively resend unacknowledged multicast data during the plurality of transmission opportunities;
wherein the controller sends the unacknowledged multicast data for the first multicast group prior to sending the multicast data belonging to the group cast retries compatible multicast stream;
wherein the controller employs a time interval between the plurality of transmission opportunities to prevent other stations on the channel from gaining control of the channel;
wherein the controller is operable to transmit multicast data belonging to a second group cast retries compatible multicast stream for a second multicast group after sending the multicast data for the first group cast retries compatible multicast stream; and
wherein the controller does not send frames for any other queue during the plurality of transmission opportunities.

7. The apparatus set forth in claim 6, wherein the block acknowledgment request is sent and waiting for the block acknowledgment occurs during a same transmission opportunity.

8. The apparatus set forth in claim 6, wherein the time interval is a priority interframe spacing.

9. The apparatus set forth in claim 6, wherein the block acknowledgment request is for a partial state block acknowledgment.

10. The apparatus set forth in claim 6, wherein the multicast frame belongs to a group cast retries compatible multicast stream.

11. The apparatus set forth in claim 6, wherein the controller reserves the channel after sending a predefined beacon.

12. The apparatus set forth in claim 11, wherein the beacon is selected from a group consisting of a delivery traffic indication map beacon and a flexible multicast service beacon.

13. The apparatus set forth in claim 6, wherein the time intervals between the plurality of transmission opportunities are backoff time intervals; and
the controller prevents direct link setup between stations on the channel.

14. The apparatus set forth in claim 6, wherein the time intervals between the plurality of transmission opportunities are backoff intervals; and
the controller prevents tunneled direct link setup between stations on the channel.

15. Logic encoded in a non-transitory computer readable medium for execution by an associated processor, and when executed operable to:
transmit channel reservation data to reserve a channel for a transmission opportunity;
transmit a multicast data belonging to a multicast stream that provides for resending frames during the transmission opportunity;
transmit at a first rate a block acknowledgement request for the multicast data during the transmission opportunity;
wait to receive a block acknowledgement for the multicast data during the transmission opportunity;
determine whether an expected block acknowledgement was not received;
resend the block acknowledgment request at a second data rate responsive to determining an expected block acknowledgement was not received;
resend unacknowledged multicast data during the transmission opportunity; and
prevent frames from any other queue from being sent during the transmission opportunity.

16. The logic of claim 15, wherein the multicast data belonging to the multicast stream is multicast data belonging to a group cast retries compatible multicast stream.

17. Logic encoded in a non-transitory computer readable medium for execution by an associated processor and when executed operable to:
transmit multicast data for a group cast retry multicast stream, a block acknowledgement request, and for a waiting to receive block acknowledgement request during a plurality of transmission opportunities, wherein the block acknowledgement request and waiting to receive the block acknowledgment occur during the same transmission opportunity;
re-transmit unacknowledged multicast data as re-transmitted multicast data during the plurality of transmission opportunities;
send a block acknowledgement request and a waiting to receive the block acknowledgement for the re-transmitted multicast data during the plurality of transmission opportunities;
wherein a time interval between the plurality of transmission opportunities is employed to prevent other stations on the channel from gaining control of the channel; and
wherein frames for any other queue are not sent during the plurality of transmission opportunities.

18. The logic of claim 17, wherein the multicast frame is sent during a first transmission opportunity and the block acknowledgment request and waiting to receive the block acknowledgment occur during a second transmission opportunity.

19. The logic of claim 17, wherein the time interval is a priority interframe space.

20. A method, comprising:

- transmitting via a channel during a first transmission opportunity to one or more stations multicast data for a multicast stream that provides for resending frames for which delivery cannot be confirmed;
- transmitting during the first transmission opportunity a partial state block acknowledgement request for the multicast data;
- waiting during the first transmission opportunity to receive a partial state block acknowledgement for the multicast data;
- determining during the first transmission opportunity whether any multicast frames from the multicast data were not acknowledged by a station; and
- re-transmitting during a second transmission opportunity selected multicast frames of the multicast data for the multicast stream that were not acknowledged during the first transmission opportunity, wherein the second transmission opportunity is spaced apart from the first transmission opportunity by a time interval selected to prevent stations other than the one or more stations from gaining control of the channel during the first and second transmission opportunities.

* * * * *

UNITED STATES PATENT AND TRADEMARK OFFICE
CERTIFICATE OF CORRECTION

PATENT NO. : 8,730,960 B2
APPLICATION NO. : 13/280835
DATED : May 20, 2014
INVENTOR(S) : Brian D. Hart, Santosh Pandey and Rohit Suri It is certified that error appears in the above-identified patent and that said Letters Patent is hereby corrected as shown below:

In the Specification column 3, line 32, "CAP" should be before "and".

column 4, line 43, between the words "may" and "distributed", insert -- be --.

column 6, line 7, "muticast group." should read "multicast group.)".

column 7, line 7, insert a -- ( -- before "e.g.", polled), should read as "(e.g., polled).

column 7, line 64, before "one multicast", delete "multicast".

column 9, line 36, before "during", insert -- "a time interval 510" --.

column 9, line 36, between the words "interval" and "that", insert -- 510 --.

column 9, line 39, delete "510".

column 9, line 40, before "employed", insert -- 502 --.

column 9, line 45, before "may" insert -- 502 --.

column 9, line 45, delete "510".

column 9, line 48, before "a", insert -- 512 --.

column 9, line 48, delete "516".

column 10, line 14, delete "a".

Signed and Sealed this
Third Day of February, 2015

Michelle K. Lee
*Deputy Director of the United States Patent and Trademark Office*

CERTIFICATE OF CORRECTION (continued)
U.S. Pat. No. 8,730,960 B2 column 10, line 47, delete "a".

column 12, line 6, delete "914" and replace it with "912".

column 12, line 11, "91.6" should read "916".

column 12, line 29, delete "910" and replace it with "922".

column 12, line 33, delete "910" and replace it with "922".